(No Model.)
A. LEITELT.
COUNTERSINK.
No. 397,483. Patented Feb. 5, 1889.
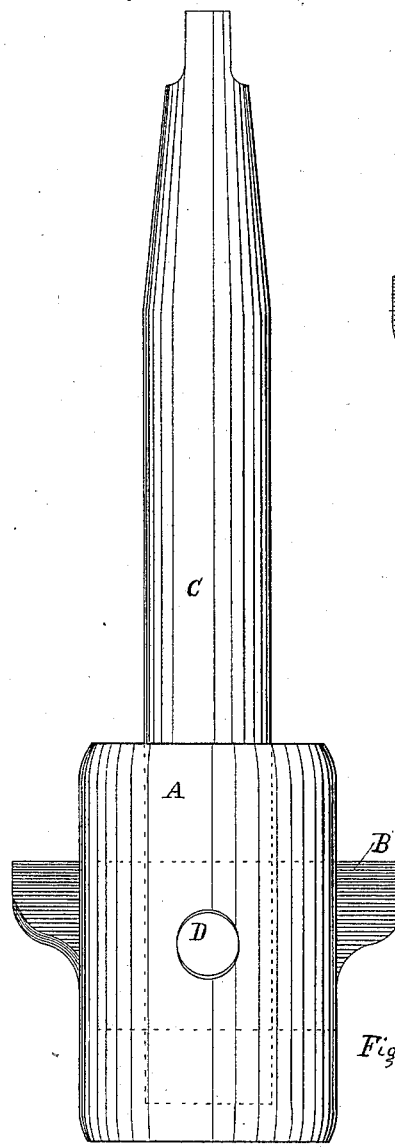
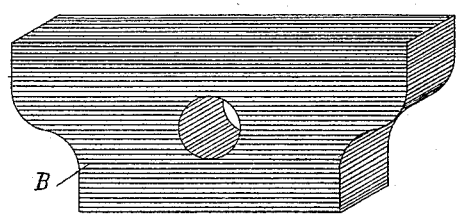
Fig. 3.
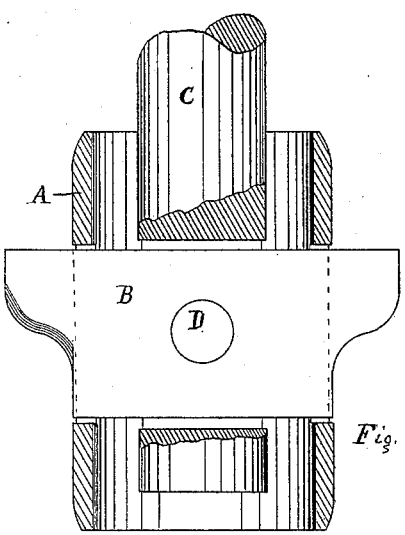
Fig. 1. Fig. 2.
WITNESSES:
Hugh E. Wilson
Harry P. Van Wagner
INVENTOR
Adolph Leitelt
BY Edward Taggart
His ATTORNEY

UNITED STATES PATENT OFFICE.

ADOLPH LEITELT, OF GRAND RAPIDS, MICHIGAN.

COUNTERSINK.

SPECIFICATION forming part of Letters Patent No. 397,483, dated February 5, 1889.

Application filed December 13, 1888. Serial No. 293,512. (No model.)

*To all whom it may concern:*

Be it known that I, ADOLPH LEITELT, a citizen of the United States, residing at the city of Grand Rapids, in the county of Kent and State of Michigan, have invented a certain new and useful Countersink, of which the following is a specification.

My invention relates to a new and useful countersink for countersinking the holes in the end plates or heads of tubular boilers and analogous devices; and the object of my invention is to attach the cutting-tool or cutter to a spindle or socket or other suitable support in a flexible manner, so as to allow the cutter to adjust itself to the boiler-head; second, to provide a cylindrical guide which will fit into the opening in the boiler-head and revolve with the cutter. These objects I accomplish by means of the mechanism illustrated in the accompanying drawings, in which—

Figure 1 is an elevation of my newly-invented countersink, showing the cutter, cylindrical guide, and cutter-support in place for use. Fig. 2 shows a longitudinal sectional view of the cutter, the guide, and a portion of the spindle; and Fig. 3 shows a perspective view of the cutter detached from the other mechanism.

Similar letters refer to similar parts throughout the several views.

The spindle is shown by C, which may be of any required shape or size.

A represents the cylindrical guide, which fits loosely over the end of the spindle C, as shown in Figs. 1 and 2. The spindle C and also guide A are each pierced by an oblong hole or slot, S showing the slot in the spindle C, and S' showing the slot in the guide A. The cutter, constructed substantially as shown in Fig. 3, fits into the slots S and S' in such a manner as to leave a small amount of play at either end, as shown in Fig. 2. The object of the play is to allow the cutter to adjust itself to the plate or boiler-head and to compensate for any curvature or unevenness of the head. At right angles to the cutter is the pin D, which I prefer to make with a taper passing through the cylindrical guide A, the spindle C, and the cutter B. This pin D, I prefer to fit closely within the spindle, but loosely in the cylindrical guide and cutter, in order to allow the cutter to readily adjust itself to the boiler-head.

I deem my invention peculiarly adapted to the work of countersinking the holes in the heads of tubular boilers; but the same may be used for other analogous purposes.

In using my invention in connection with tubular boilers the guide A should be about the same diameter as the tubes to be used in the boiler, and should pass through the head a sufficient distance to allow the cutter B to be brought into contact with the rim of the hole to be countersunk. The cutter is then given a revolving and forward motion by any suitable power and mechanism until the required amount of the rim of the hole shall have been cut away, when the tool is removed or raised and another hole operated upon in a similar way.

By the use of my invention all the holes in the boiler-head can be countersunk in a uniform manner and the irregularities of the boiler-head will not prevent the perfect working of the device.

In preparing the countersink for use in connection with tubular boilers a portion of one of the boiler-tubes may be readily converted into a guide.

Having thus described my invention, what I claim to have invented, and desire to secure by Letters Patent, is—

1. In a countersink-machine, the combination of a cutting-tool or cutter, a spindle, and a cylindrical guide, said cutter passing loosely through the guide and held in position by means of a pin passing through the cutter at right angles thereto, fitting loosely within the cylindrical guide, substantially as described.

2. In a countersink-machine, the combination of a slotted guide and cutter, said cutter passing loosely through the slot in said guide, and both guide and cutter attached by a pin to the revolving mechanism, said cutter adapted to adapt itself to the form of the boiler-head, substantially as described.

3. In a countersink-machine, a cylindrical guide adapted to fit into the hole to be operated upon, in combination with a cutter passing loosely through a slot in said guide, and the tapering pin passing through both guide and cutter at right angles to the cutter, thereby allowing a flexible adjustment for the cutter, substantially as described.

In witness whereof I have hereunto set my hand and seal in the presence of two witnesses.

ADOLPH LEITELT. [L. S.]

Witnesses:
ARTHUR C. DENISON,
HUGH E. WILSON.